April 29, 1958  M. L. CLEVETT, JR., ET AL  2,832,116
BAG CLOSURE FASTENER
Filed Feb. 23, 1954
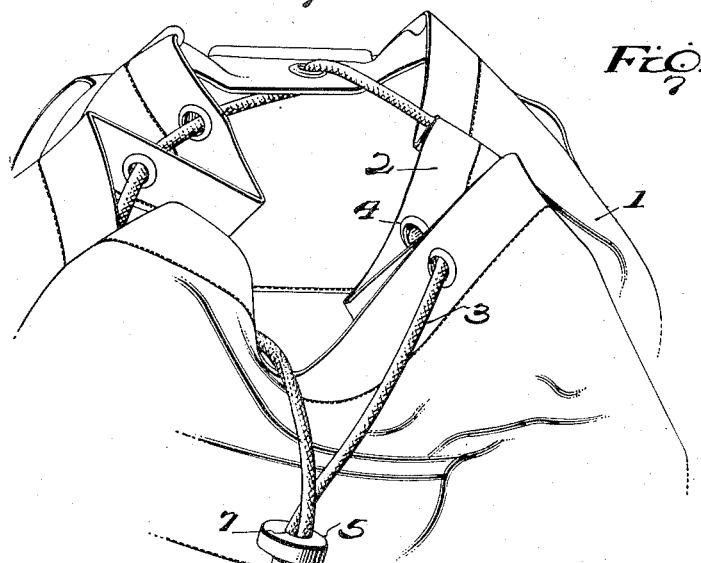
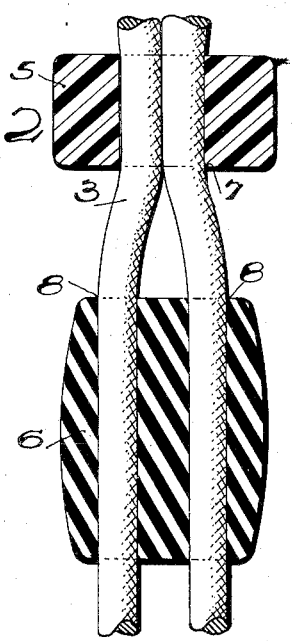
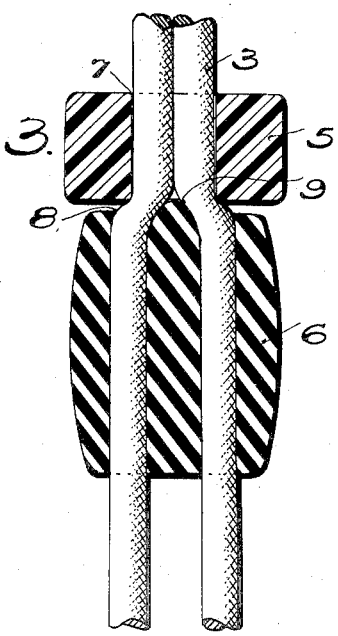
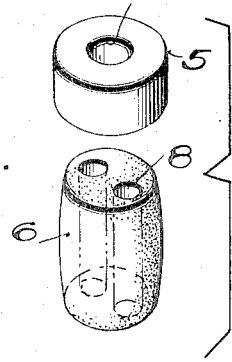
INVENTORS
Merton L. Clevett, Jr.
John S. Brown
*W. J. Eccleston*
ATTORNEY.

2,832,116

BAG CLOSURE FASTENER

Merton L. Clevett, Jr., Natick, Mass., and John S. Brown, Arlington, Va., assignors to the United States of America as represented by the Secretary of the Army Application February 23, 1954, Serial No. 412,139

1 Claim. (Cl. 24—30.5)

(Granted under Title 35, U. S. Code (1952), sec. 266)

The invention described herein, if patented, may be manufactured and used by or for the Government for governmental purposes, without the payment to us of any royalty thereon.

This invention relates to bag closures and fasteners and has for its primary object to provide a simplified and inexpensive closure of the drawstring type which may be automatically locked in closed position.

Another object of the invention consists in providing a lockable closure of the drawstring type which is of such simplified construction that it may be readily operated in cold weather to either locked or unlocked position and open or closed position by personnel having their hands incased in gloves or mittens.

Other objects and advantages of the invention will be apparent from the following description when taken in connection with the accompanying drawings, in which, Figure 1 is a perspective view of the upper end of a bag provided with a drawstring closure and having incorporated therein the fastening means of the present invention;

Figure 2 is an enlarged fragmentary sectional view of the slidable locking members of the fastener in unlocked relationship;

Figure 3 is a similar view showing the slidable fasteners in locked position wtih respect to the drawstring, and, Figure 4 is a perspective view of the slidable members per se.

The bag illustrated in the drawings for the purpose of indicating the manner of operation of the novel fastener is indicated by the numeral 1 and is provided with a hem or reinforced end 2 in which a conventional drawstring 3 is interlaced through the medium of the spaced eyelets 4.

The fastening means for securing the drawstring against movement after it is operated to close the bag or the like, consists of two slidable members; the disk-shaped member 5 and the substantially barrel-shaped member 6.

The member 5 is provided with a single central opening of sufficient dimensions to permit the two elements of the drawstring to slide therethrough and is indicated by the numeral 7. The barrel-shaped member 6, on the other hand, is provided with two laterally spaced openings 8, one on each side of the center line of this element.

The disk-shaped member 5 is of somewhat lesser longitudinal dimension than the member 6 and is preferably positioned inwardly of the member 6, i. e., closer to the loop portion of the drawstring, and the barrel-shaped member 6 is preferably of somewhat less diameter than the member 5, particularly at the end adjacent the member 5 for a purpose to be later described. The member 5 is of rigid construction and may be formed of any of the well-known plastics, while the member 6 is formed of rubber or the like.

In the operation of the fastener the novel positioning and arrangement of the openings 7 and 8 in the members 5 and 6 provide a wedging action between the parts as slightly hinted at by the position of the parts in Figure 2 and as fully illustrated in Figure 3, wherein the elastic member 6 is forced into close relationship with the rigid member 5 so as to wedge the two sections of the drawstring against the wall of the opening 7, as a central portion 9 of the elastic material is jammed in between the sections of the drawstring at the point where they enter the member 7, thereby locking the sections against relative movement with respect to the members 5 and 6.

In the operation of the device, assuming the parts being of the relative position shown in Figure 1, the drawstring is drawn tight so as to gather tightly together the sections of the mouth of the bag so as to close the bag, and the member 5 is forced inwardly toward the bag as far as possible. Thereafter the elastic member 6 is forced into close relationship to the member 5 (see Fig. 3) so as to lock the sections of the drawstring against movement, as just described. It will be obvious that due to the simplicity of the construction the members 5 and 6 may be moved into locking position by gloved hands, since finger dexterity is unnecessary in the operation of the device. Also as hereinbefore mentioned, the lesser diameter of the inner end of the member 6 permits the bag to be unlocked by gloved hands since one of the gloved hands of the operator may readily engage the lower edge of the member 5 and force it away from the member 6 while the latter is firmly grasped by the other hand.

According to the patent statutes, we have described what we now consider to be the preferred form of the construction, but inasmuch as various minor changes may be made in structural details without departing from the spirit of the invention, it is intended that such changes be included within the scope of the appended claim.

We claim:

In combination with the drawstring of a bag or the like, a disk-like member having planar upper and lower surfaces and having a central opening therethrough from the upper to the lower surface and through which the free ends of the drawstring are slidable, an elongated second member provided with a planar surface immediately adjacent one of the planar surfaces of the disk-like member, said elongated member having a pair of laterally spaced parallel openings therethrough of a diameter to snugly and slidably receive the respective ends of the drawstring said openings being in proximate alignment with the opening in the disk-like member, said second member being formed of elastic material and adapted to cooperate with the first-mentioned member to lock said drawstring against movement therethrough when the second-mentioned member is forced into approximate contact with the first-mentioned member.

References Cited in the file of this patent

UNITED STATES PATENTS

| | | |
|---|---|---|
| 515,155 | Nelson | Feb. 20, 1894 |
| 1,368,545 | Childers | Feb. 15, 1921 |
| 1,442,531 | Mather et al. | Jan. 16, 1923 |
| 2,163,660 | Brooks | June 27, 1939 |
| 2,463,116 | Lewis | Mar. 1, 1949 |

FOREIGN PATENTS

| | | |
|---|---|---|
| 115,669 | Australia | Aug. 20, 1942 |